US010599109B2

(12) United States Patent
Delaney et al.

(10) Patent No.: US 10,599,109 B2
(45) Date of Patent: Mar. 24, 2020

(54) OPTIMIZING APPLIANCE BASED ON PREPARATION TIME

(71) Applicant: INTERNATIONAL BUSINESS MACHINES CORPORATION, Armonk, NY (US)

(72) Inventors: Mark Delaney, Raleigh, NC (US); Donna K. Byron, Petersham, MA (US); Robert H. Grant, Atlanta, GA (US); Charlotte Hutchinson, Reigate (GB)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 15/926,202

(22) Filed: Mar. 20, 2018

(65) Prior Publication Data
US 2019/0294128 A1  Sep. 26, 2019

(51) Int. Cl.
*G05B 15/02* (2006.01)
(52) U.S. Cl.
CPC .................... *G05B 15/02* (2013.01)
(58) Field of Classification Search
CPC ................... G05B 15/02; F24F 11/00
See application file for complete search history.

(56) References Cited

U.S. PATENT DOCUMENTS

| 8,306,634 | B2 | 11/2012 | Nguyen et al. |
| 9,541,912 | B1 | 1/2017 | Grossman, IV et al. |
| 9,574,894 | B1 * | 2/2017 | Karakotsios ....... G01C 21/3617 |
| 2008/0270814 | A1 * | 10/2008 | Starr ..................... G06F 1/3203 |
| | | | 713/323 |
| 2010/0127854 | A1 | 5/2010 | Helvick et al. |

(Continued)

FOREIGN PATENT DOCUMENTS

| CN | 104615107 A | 5/2015 |
| EP | 2304709 A2 | 4/2011 |
| EP | 2463818 A1 | 6/2012 |

OTHER PUBLICATIONS

Quinlan, "7 Smart Applicances You Can Control With Your Phone," Food and Wine, Oct. 23, 2014 http://www.foodandwine.com/blogs/7-smart-appliances-you-can-control-your-phone, pp. 1-2.
(Continued)

*Primary Examiner* — Vincent H Tran
(74) *Attorney, Agent, or Firm* — Jordan T. Schiller (57) ABSTRACT

The program directs a computer processor to implement a method that dynamically operates one or more appliances. The method estimates a time period for a user to arrive at a location, wherein the estimated time period is based on one or more time constraints, and identifies one or more appliances needed based on at least an instruction set. The method further generates and sends one or more operating commands to the identified one or more appliances based on the estimated time period, updates the estimated time period based on a change in the one or more time constraints, and generates and sends one or more updated operating commands to the identified one or more appliances, based on the updated estimated time period. The method may further detect a current location of the user and receive travel data that corresponds to the one or more time constraints.

17 Claims, 7 Drawing Sheets

(56) References Cited

U.S. PATENT DOCUMENTS

| | | | | |
|---|---|---|---|---|
| 2015/0024790 A1* | 1/2015 | Hwang | ............... | H04W 4/90 455/456.6 |
| 2015/0230056 A1* | 8/2015 | Shin | ............... | G01C 21/36 455/420 |
| 2015/0309484 A1* | 10/2015 | Lyman | ............... | G05B 13/0205 700/275 |
| 2016/0202677 A1* | 7/2016 | Trundle | ............... | G08C 19/16 700/275 |
| 2017/0115652 A1* | 4/2017 | Grossman, IV | ............... | G05B 19/02 |
| 2018/0299152 A1* | 10/2018 | Libal | ............... | F24F 11/30 |
| 2019/0130005 A1* | 5/2019 | Byron | ............... | G06Q 30/0631 |
| 2019/0146441 A1* | 5/2019 | Cirino | ............... | H04W 68/005 |

OTHER PUBLICATIONS

Williams, "Let's Get Cooking," IBM Chef Watson, https://www.ibmchefwatson.com/community, Printed on Jan. 29, 2018, pp. 1-2.

MTA Metro North, "The best Metro-North app just got even better," Sep. 30, 2015, http://web.mta.info/mnr/html/traintimeapp.htm, pp. 1-2.

Somerville, "Live London Underground map," Data collected: Jan. 29, 2018, https://traintimes.org.uk/map/tube/, pp. 1-1.

Supercook, "Dinner's Met its Match!," http://www.supercook.com/#/recipes, Printed on Jan. 29, 2018, pp. 1-1.

Lamkin, "Connected Cooking: The best smart kitchen devices and appliances," Jun. 20, 2017, https://www.wareable.com/smart-home/best-smart-kitchen-devices, pp. 1-11.

Wollerton, "GE updates app to allow for remote oven access," Jan. 6, 2014, https://www.cnet.com/news/ge-updates-app-to-allow-for-remote-oven-access/, CNET.com, pp. 1-3.

Mell et al., "The NIST Definition of Cloud Computing," National Institute of Standards and Technology, U.S. Department of Commerce, Special Publication 800-145, Sep. 2011, pp. 1-7.

* cited by examiner

OPTIMIZING APPLIANCE BASED ON PREPARATION TIME

BACKGROUND

The present disclosure relates generally to the field of cognitive computing, Internet of Things (IoT), and more particularly to data processing and dynamic operation of appliances. Deciding on what to make for dinner may depend on an availability of ingredients and an availability of functioning appliances to prepare the ingredients. Oftentimes, there is a significant amount of preparation time of one or more appliances prior to utilizing the appliance. For example, a recipe may include pre-heating an oven or a fryer to 350 degrees, which may take more or less than twenty minutes, depending on the type of appliance.

Time is a valuable commodity in this world. A problem that many individuals encounter on a daily basis is deciding what to make for a meal while commuting home. Even if a consumer has a recipe, the time requirement to prepare various appliances, such as the amount of time required to pre-heat the oven or the fryer for example, may deter an individual from following a particular recipe and opt for something more expedient.

BRIEF SUMMARY

Embodiments of the present invention disclose a method, a computer program product, and a system.

According to an embodiment, a method, in a data processing system including a processor and a memory, for implementing a program that operates one or more appliances. The method includes estimating a time period for a user to arrive at a location, wherein the estimated time period is based on one or more time constraints. The method further includes identifying one or more appliances needed based on at least an instruction set, and generating and sending one or more operating commands to the identified one or more appliances based on the estimated time period. The method further includes updating the estimated time period based on a change in the one or more time constraints, and generating and sending one or more updated operating commands to the identified one or more appliances, based on the updated estimated time period.

According to another embodiment, a computer program product for directing a computer processor to implement a program that operates one or more appliances. The storage device embodies program code that is executable by a processor of a computer to perform a method. The method includes estimating a time period for a user to arrive at a location, wherein the estimated time period is based on one or more time constraints. The method further includes identifying one or more appliances needed based on at least an instruction set, and generating and sending one or more operating commands to the identified one or more appliances based on the estimated time period. The method further includes updating the estimated time period based on a change in the one or more time constraints, and generating and sending one or more updated operating commands to the identified one or more appliances, based on the updated estimated time period.

According to another embodiment, a computer system for implementing a program that manages a device, includes one or more computer devices each having one or more processors and one or more tangible storage devices. The one or more storage devices embody a program. The program has a set of program instructions for execution by the one or more processors. The program instructions include instructions for estimating a time period for a user to arrive at a location, wherein the estimated time period is based on one or more time constraints. The program instructions further include instructions for identifying one or more appliances needed based on at least an instruction set, and generating and sending one or more operating commands to the identified one or more appliances based on the estimated time period. The program instructions further include instructions for updating the estimated time period based on a change in the one or more time constraints, and generating and sending one or more updated operating commands to the identified one or more appliances, based on the updated estimated time period.

DETAILED DESCRIPTION

The present invention discloses a method that remotely, and dynamically, operates one or more appliances in a user's home based on a user's real time commute, estimated arrival time, recipe, and availability of appliances. The present invention accounts for time constraints of a user's commute, such as traffic, unexpected delays and/or travel interruptions, and so forth.

Advantages of the present invention include, but are not limited to: reduced wait time for a user between arriving home and eating a home-cooked meal; an enhanced user experience for cooking a meal; enhanced time management for a user; and higher efficiency of an appliance usage.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Figure 1:
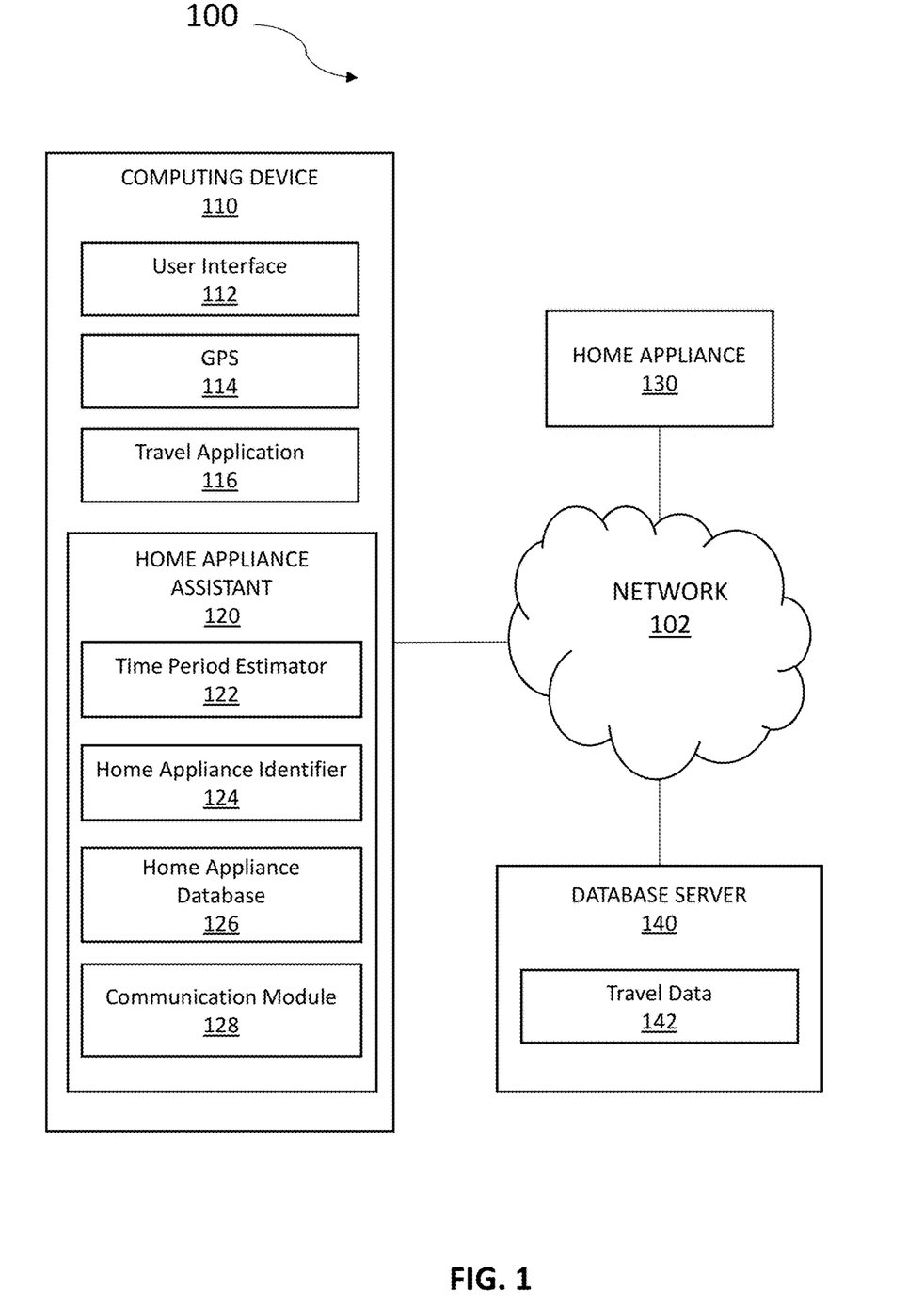
FIG. 1 illustrates home appliance computing environment 100, in accordance with an embodiment of the present invention.

FIG. 1 illustrates home appliance computing environment 100, in accordance with an embodiment of the present invention. Home appliance computing environment 100 includes computing device 110, home appliance 130, and database server 140 all connected via network 102. The setup in FIG. 1 represents an example embodiment configuration for the present invention, and is not limited to the depicted setup in order to derive benefit from the present invention.

In the example embodiment, computing device 110 contains user interface 112, global positioning system (GPS) 114, travel application 116, and home appliance assistant 120. In various embodiments, computing device 110 may be a laptop computer, tablet computer, netbook computer, personal computer (PC), a desktop computer, a personal digital assistant (PDA), a smart phone, or any programmable electronic device capable of communicating with home appliance 130 and database server 140 via network 102. Computing device 110 may include internal and external hardware components, as depicted and described in further detail below with reference to FIG. 5. In other embodiments, computing device 110 may be implemented in a cloud computing environment, as described in relation to FIGS. 6 and 7, herein. Computing device 110 may also have wireless connectivity capabilities allowing it to communicate with home appliance 130, database server 140, and other computers or servers over network 102.

In the example embodiment, computing device 110 includes user interface 112, which may be a computer program that allows a user to interact with computing device 110 and other connected devices via network 102. For example, user interface 112 may be a graphical user interface (GUI). In addition to comprising a computer program, user interface 112 may be connectively coupled to hardware components, such as those depicted in FIG. 5, for receiving user input. In the example embodiment, user interface 112 is a web browser, however in other embodiments user interface 112 may be a different program capable of receiving user interaction and communicating with other devices.

In the example embodiment, GPS 114 is a computer program on computing device 110 that provides time and location information for a user. Modern GPS systems operate on the concept of time and location. In modern GPS systems, four or more satellites broadcast a continuous signal detailing satellite identification information, time of transmission (TOT), and the precise location of the satellite at the time of transmission. When a GPS receiver picks up the signal, it determines the difference in time between the time of transmission (TOT) and the time of arrival (TOA). Based on the amount of time it took to receive the signals and the precise locations of the satellites when the signals were sent, GPS receivers are capable of determining the location where the signals were received. In the example embodiment, GPS 114 is capable of providing real-time location detection of the user, together with an estimated time of arrival for a given destination based on real-time traffic, weather conditions, and so forth. GPS 114 may also include alternate routes and/or means of transportation to reach a destination.

In an exemplary embodiment, travel application 116 may be a software program, on computing device 110, that contains transportation information for mass transit such as local train schedules, bus schedules, airplane schedules or any other public transportation schedules that a user frequents, together with notifications, announcements, and alerts regarding schedule delays, cancellations, interrupted services, and so forth. In exemplary embodiments, transportation information may further include private entities such as car services, bike services, and any other transportation means that are commonly frequented. For example, transportation information for bike services may include locations of bike rental stations, availability of bike rentals, and estimated time for a user to reach a destination from the bike rental station.

In exemplary embodiments, travel application 116 may include real-time information regarding emergency happenings (i.e. car accident, bridge collapse, fire, etc.) or public events (i.e. sporting events, concerts) that may affect transportation information. In alternative embodiments, travel application 116 may provide alternate routes and/or means of transportation recommendations to reach a destination.

Travel application 116, in exemplary embodiments, is capable of communicating with home appliance assistant 120.

With continued reference to FIG. 1, home appliance 130 may include one or more electronic appliances found within a home of a user. In exemplary embodiments, home appliance 130 may be an electrical/mechanical machine which accomplishes some household functions, such as cooking or cleaning. Some examples of home appliance 130 may include a kitchen device (i.e. blender, fryer, oven, mixer, crockpot, coffee maker, refrigerator, dishwasher, microwave, etc.), a washer/dryer, an air-conditioner, a television, a space heater, and so forth.

In exemplary embodiments, home appliance 130 may be a kitchen appliance or cooking device located in the kitchen of the user that is capable of wirelessly communicating with computing device 110 and database server 140 via network 102 to relay relevant information to the user in real-time via home appliance assistant 120. Relevant information to the user may include the availability of the specific home appliance 130, for example whether it is functioning properly, whether it is clean, whether it needs time to warm up (and how much time) prior to using, and whether it has power in its batteries (if battery operated). The specific home appliance 130 may also convey to the user, with regards to a kitchen appliance, the required time to cook a food item, the preparation time involved, and the typical amount of time to clean up after the food item is cooked or prepared.

In exemplary embodiments, one or more home appliances 130 may be capable of communicating with each other based on an internet of things (IoT) network. An IoT network may comprise a network of physical devices, vehicles, home appliances 130, and other items embedded with electronics, sensors, actuators, and connectivity which enables these objects to connect and exchange data.

In exemplary embodiments, each home appliance 130 may be uniquely identifiable through its embedded computing system but is able to inter-operate within the existing Internet infrastructure. The IoT network allows objects to be sensed or controlled remotely across existing network infrastructure, thereby creating opportunities for more direct integration of the physical world into a computer-based system resulting in improved efficiency, accuracy, and economic benefit in addition to reduced human intervention.

Furthermore, home appliance 130 may be capable of collecting useful data with the help of various existing technologies and then autonomously flow the data between other devices within the IoT network. For example, the blender may receive an alert when the oven reaches a pre-heat temperature of 350 degrees, or the coffee maker may turn on when it receives information that the oven has been turned off, and so forth.

With continued reference to FIG. 1, database server 140 includes travel data 142 and may be a laptop computer, tablet computer, netbook computer, personal computer (PC), a desktop computer, a personal digital assistant (PDA), a smart phone, a server, or any programmable electronic device capable of communicating with computing device 110 and home appliance 130 via network 102. While database server 140 is shown as a single device, in other embodiments, database server 140 may be comprised of a cluster or plurality of computing devices, working together or working separately.

In exemplary embodiments, travel data 142 may include historical travel data of a plurality of users, and/or of one or more specific users. For example, travel data 142 may further include average driving speeds of drivers located in specific geographical areas, together with traffic patterns for specific times of day, and specific days of the week. For example, travel data 142 may distinguish between peak and off-peak hours of road congestion, as well as average delays due to inclement weather conditions. In exemplary embodiments, travel data 142 may further include average travel speed for mass transit in various weather conditions in order to assist in determining estimated arrival times during inclement weather.

Travel data 142 may further include user-specific travel habits, such as days and times of the week driving on highways, days and times of the week using public transit, average driving speed in various weather conditions, and so forth. Travel data 142, in exemplary embodiments, may continually be updated, stored, and used as a reference for home appliance assistant 120 in estimating travel time for a user.

With continued reference to FIG. 1, home appliance assistant 120, in the example embodiment, may be a computer application on computing device 110 that contains instruction sets, executable by a processor. The instruction sets may be described using a set of functional modules. Home appliance assistant 120 receives input from user interface 112, GPS 114, travel application 116, home appliance 130, and database server 140. In alternative embodiments, home appliance assistant 120 may be a standalone program on a separate electronic device.

With continued reference to FIG. 1, the functional modules of home appliance assistant 120 include time period estimator 122, home appliance identifier 124, home appliance database 126, and communication module 128.

Figure 2:
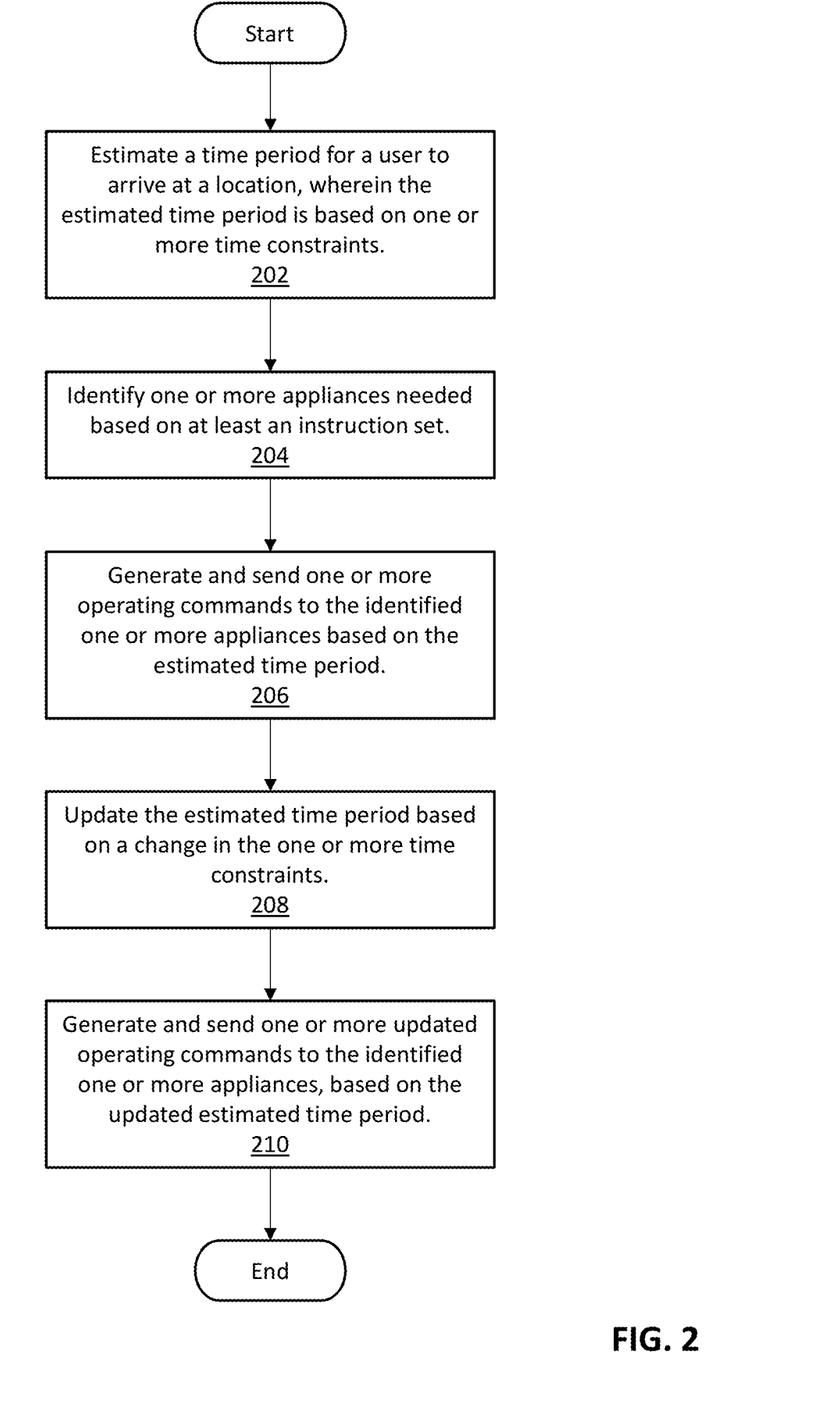
FIG. 2 is a flowchart illustrating the operation of home appliance assistant 120 of FIG. 1, in accordance with an embodiment of the present invention.

FIG. 2 is a flowchart illustrating the operation of home appliance assistant 120 of FIG. 1, in accordance with embodiments of the present invention.

With reference to FIGS. 1 and 2, time period estimator 122 includes a set of programming instructions in home appliance assistant 120, to estimate a time period for a user to arrive at a location, wherein the estimated time period is based on one or more time constraints (step 202). In exemplary embodiments, one or more time constraints include at least one, or any combination thereof, of the following: travel time to arrive at the location, traffic patterns, weather conditions, transportation delays, public events, interrupted transportation services, emergency events, public transportation schedules, and an amount of time required to fulfill an instruction set. In an exemplary embodiment, the instruction set may include a recipe, such as a food recipe detailing necessary ingredients, steps, required appliances, appliance preparation time, food preparation time, and so forth.

In an exemplary embodiment, time period estimator 122 may further include a set of programming instructions in home appliance assistant 120 to detect a current location of the user, and receive travel data that corresponds to the one or more time constraints, wherein the estimated time period for the user to arrive at a location is based on evaluating the received travel data. Travel data may, in the exemplary embodiment, includes mass transit departure/arrival schedules, delay/cancellation notifications, emergency alerts, and so forth.

Figure 3:
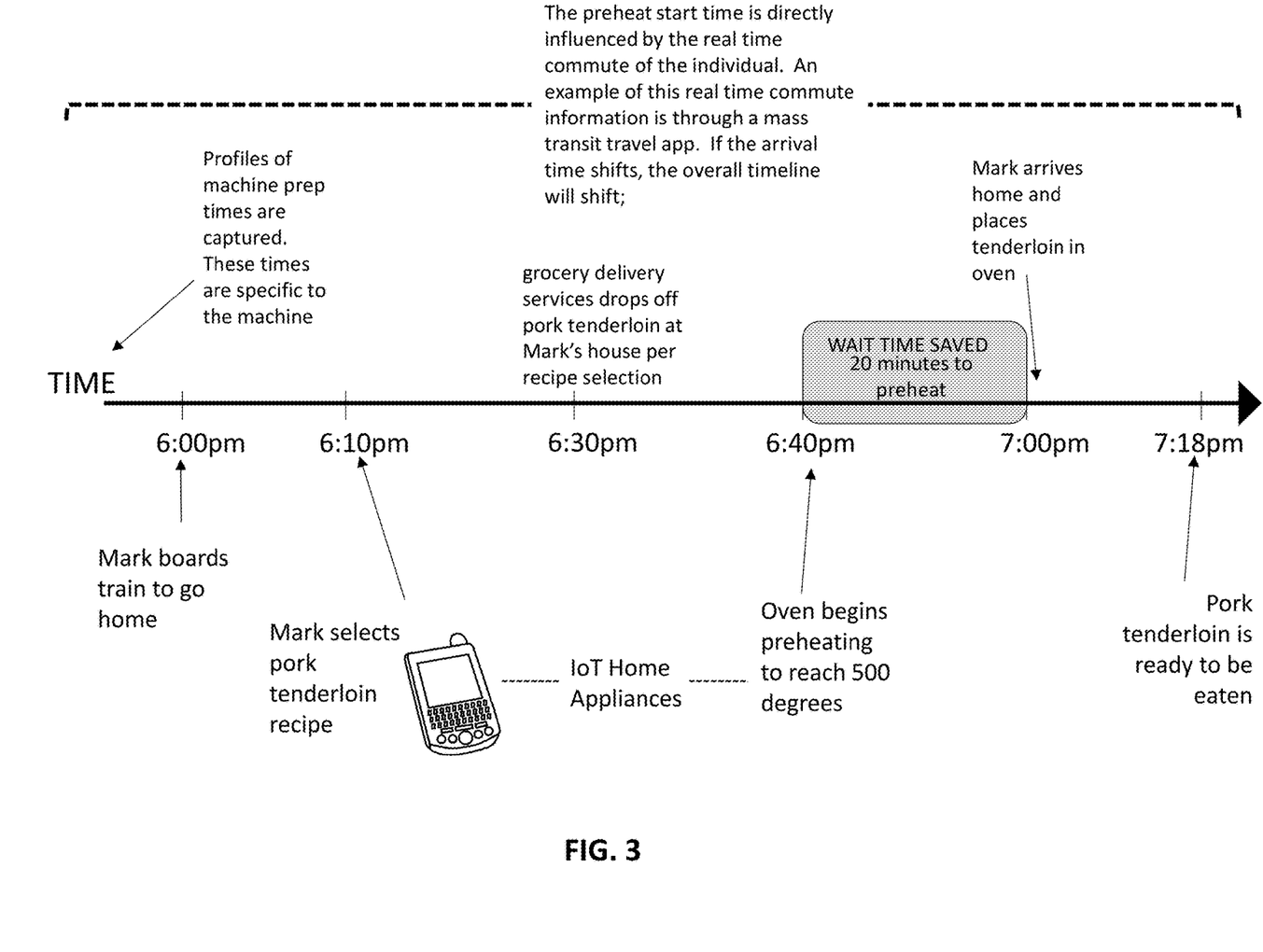
FIG. 3 illustrates a first use case of home appliance assistant 120 of FIG. 1, in accordance with an embodiment of the present invention.

FIG. 3 illustrates a first use case of home appliance assistant 120 of FIG. 1, in accordance with an embodiment of the present invention.

With reference to an illustrative example, as depicted in FIG. 3, Mark has just boarded his train at 6:00 pm for his one-hour ride home from work on a Wednesday night. Using home appliance assistant 120 on his mobile device, Mark begins to scroll through his phone for recipe ideas for dinner. Time period estimator 122 determines that Mark will not arrive home until 7:00 pm after considering the one-hour train ride with no anticipated delays or extraneous time constraints. As such, home appliance assistant 120 refers an optimized cooking plan based on Mark's chosen recipe of a pork tenderloin and his anticipated time of arrival at home. The pork tenderloin has a fairly straight forward cooking procedure as follows: (1) Pre-heat oven to 500 degrees for 20 minutes; (2) Roast pork tenderloin for 18 minutes; and (3) Serve.

With continued reference to FIGS. 1 and 2, home appliance identifier 124 includes a set of programming instructions in home appliance assistant 120, to identify one or more appliances needed based on at least an instruction set (step 204). The set of programming instructions is executable by a processor.

In an exemplary embodiment, home appliance identifier 124 is capable of determining if the one or more appliances is being utilized, not being utilized, or non-functioning. For example, "being utilized" may mean that the appliance is currently being used and is unavailable; "not being utilized" may mean that the appliance is currently available to be used; and "non-functioning" may mean that the appliance does not work, needs to be cleaned, gas line is disconnected, power cord is broken, or is unavailable for some other technical reason. Furthermore, home appliance identifier 124 may receive property specifications for the one or more appliances that are not being utilized and identify the one or more appliances that are needed based on the determined one or more appliances that are not being utilized, as well as based on the received property specifications for the one or more appliances that are not being utilized.

With continued reference to the illustrative example in FIG. 3, the majority of Mark's pork tenderloin recipe involves the preparation/wait time of the oven pre-heating, which is 20 minutes. Thus, even if Mark hurries home to pre-heat the oven, he must still wait 20 minutes until the oven is ready for the pork tenderloin to be placed inside. Luckily for Mark, his phone is connected to the IoT network of devices within his kitchen at home. Home appliance identifier 124 is capable of detecting the IoT connected oven in his kitchen, which, over time has developed a profile for the oven based on monitored historical pre-heating times, based on various recipes. The monitored data for the IoT oven is stored, in home appliance database 126. As such, home appliance identifier 124 is capable of recognizing the extensive pre-heat/wait time associated with the selected pork tenderloin recipe.

In an exemplary embodiment, home appliance database 126 is local data storage on home appliance assistant 120 that may contain a list of one or more home appliances with associated property specifications. While home appliance database 126 is depicted as being stored on home appliance assistant 120, in other embodiments, home appliance database 126 may be stored on computing device 110, or database server 140, as a separate database.

In exemplary embodiments, property specifications may include the size of the home appliance 130 (i.e. how much it can hold), whether it is currently available to be used (i.e. it was recently used and is now in the dishwasher; it is non-functioning; it is currently in use), how long it takes for the home appliance 130 to be ready for use (i.e. pre-heating time based on model), and so forth. For example, a newer model oven may only require 10 minutes of pre-heating to reach 250 degrees, while an older model oven may require 30 minutes of pre-heating to reach 250 degrees. Home appliance database 126, in exemplary embodiments, may continually, and dynamically, be updated and used as a reference for property specifications and active status of a home appliance 130.

With continued reference to FIGS. 1 and 2, communication module 128 includes a set of programming instructions in home appliance assistant 120, to generate and send one or more operating commands to the identified one or more appliances based on the estimated time period (step 206). The set of programming instructions is executable by a processor. In exemplary embodiments, one or more operating commands may include, but are not limited to, turning on, turning off, raising, lowering, increasing, and decreasing. For example, communication module 128 may send a command to a home appliance 130, such as an oven, to increase the pre-heating temperature or to decrease the pre-heating temperature. In other embodiments, communication module 128 may send a command to turn on, or turn off, a home appliance 130. In exemplary embodiments, communication module 128 sends the one or more operating commands to the identified one or more home appliances 130 via network 102.

In exemplary embodiments, communication module 128 may be capable of comparing the estimated time period for a user to arrive at a location with an amount of time required to prepare the one or more appliances according to the instruction set, and adjusting the one or more appliances, in accordance with the instruction set, before the user arrives at the location based on the estimated time period for the user to arrive at the location.

With continued reference to the illustrative example in FIG. 3, communication module 128 communicates to Mark's IoT oven to begin pre-heating to 500 degrees when Mark is 20 minutes away from his home, according to the learning of pre-heating times that the oven has done in the past, and based on time period estimator 122. When Mark duly arrives home as expected at 7:00 pm, the oven is pre-heated to 500 degrees and he is able to place the pork tenderloin in the oven immediately. Thanks to home appliance assistant 120, Mark has saved 20 minutes of oven preparation time and has enhanced his cooking experience and overall efficiency.

In various embodiments, adjusting the one or more appliances, via communication module 128, may further include at least one, or a combination thereof, of the following: turning on, turning off, raising, lowering, increasing, and decreasing. For example, communication module 128 may be capable of generating and sending one or more commands to turn on an oven, based on a user's anticipated arrival time at home, and likewise lower the pre-heat temperature of the oven based on a delay in the user's anticipated arrival time.

In exemplary embodiments, communication module 128 is capable of updating the estimated time period based on a change in the one or more time constraints, and generating and sending one or more updated operating commands to the identified one or more appliances, based on the updated estimated time period (step 208).

In exemplary embodiments, communication module 128 is capable of generating and sending one or more updated operating commands to the identified one or more appliances, based on the updated estimated time period (step 210).

In exemplary embodiments, communication module 128 is capable of dynamically generating and sending one or more updated operating commands to the identified one or more home appliances 130 based on a detected change in an estimated time of arrival, via time period estimator 122. For example, if a user's train is running 10 minutes late, communication module 128 may delay the pre-heating of the oven by 10 minutes. In exemplary embodiments, home appliance assistant 120 is capable of updating itself in real-time.

In alternative embodiments, adjusting the one or more appliances, via communication module 128, may further include turning the one or more appliances on, turning the one or more appliances off, and turning the one or more appliances on again based on an updated estimated time period for the user to arrive at the location. In alternative embodiments, communication module 128 may adjust the operation of the one or more appliances pursuant to building code regulations, such as avoidance of utilizing more than two plugged-in kitchen devices at the same time, fire hazards, detection of a smoke alarm sounding, and so forth. In various embodiments, home appliance assistant 120 may be linked to a user's home security system and/or local fire department in order to effectively alert the authorities in the event of a fire or other emergency.

With reference to a specific embodiment, adjusting the one or more appliances, via communication module 128, may further include initiating a pre-heating cycle for an oven so that the oven is ready to bake when the user arrives at the location. Further, communication module 128 may be capable of extending the pre-heating cycle for the oven by reducing a change in input energy, based on an updated estimated time period for the user to arrive at the location.

In a further exemplary embodiment, communication module 128 may include leaving the pre-heating cycle for the oven intact until a delay threshold is met, turning off the pre-heating cycle for the oven if the delay threshold is greater than a pre-defined value, and extending the pre-heating cycle for the oven if the delay threshold is equal to or less than a pre-defined value.

Figure 4:
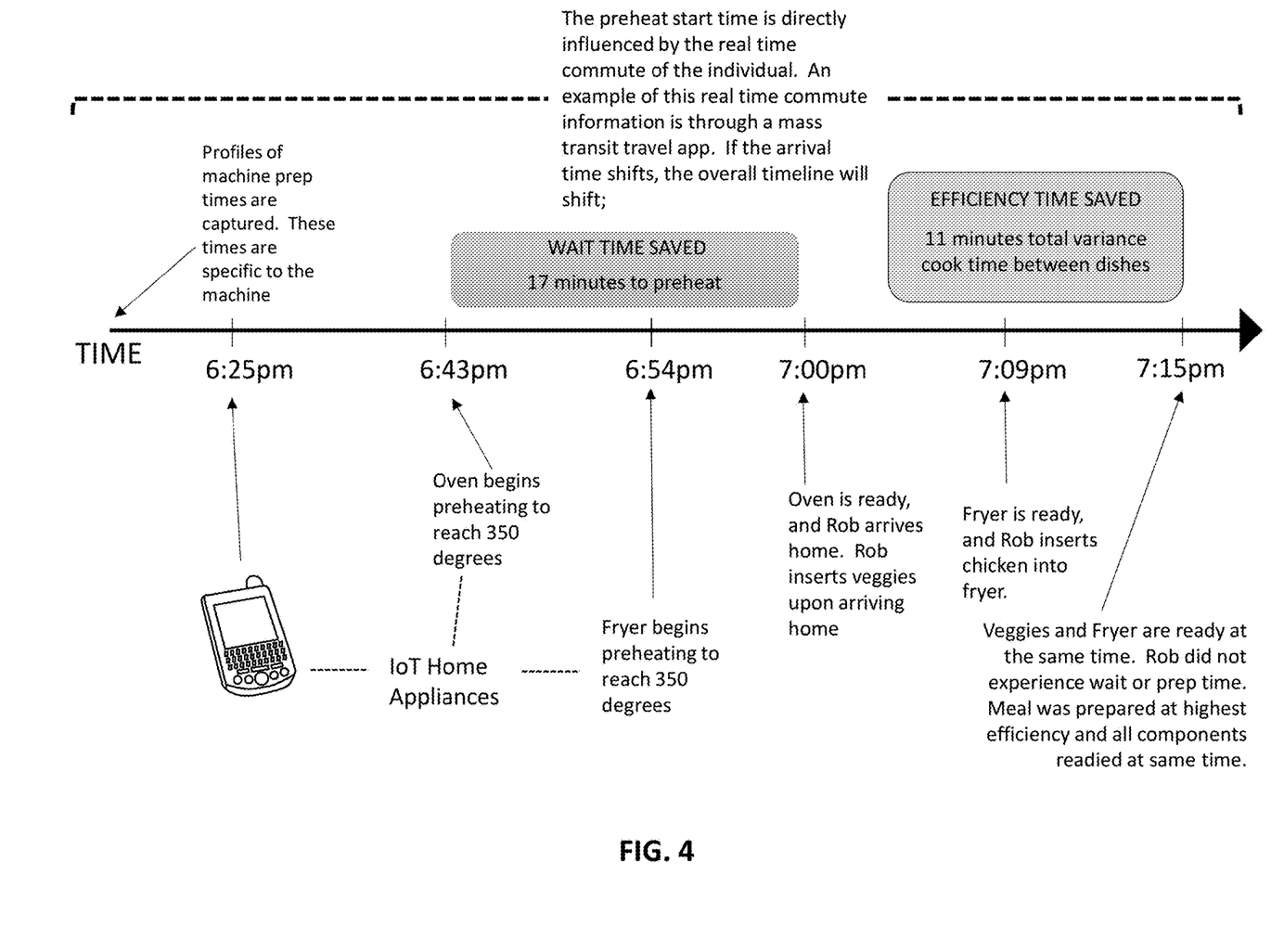
FIG. 4 illustrates a second use case of home appliance assistant 120 of FIG. 1, in accordance with an embodiment of the present invention.

FIG. 4 illustrates a second use case of home appliance assistant 120 of FIG. 1, in accordance with an embodiment of the present invention.

With reference to FIG. 4, Rob is on his way home from work and has selected a recipe for baked vegetables and fried chicken. The chicken requires 6 minutes frying in 350-degree oil and the vegetables require 15 minutes of bake time in the oven at 350-degrees. Time period estimator 122 determines that Rob is due home in 35 minutes. Home appliance identifier 124 determines that Rob has a functioning personal size fryer and oven in his home, both of which home appliance assistant 120 has monitored preheating times since he bought the devices. As such, home appliance identifier 124 has a developed an optimal preparation time profile specific to each device, stored in home appliance database 126. Based on the stored data, the fryer requires 15 minutes of pre-heating time to reach 350-degrees and the oven requires 17 minutes of pre-heating time to reach 350-degrees.

With continued reference to the illustrative example in FIG. 4, home appliance assistant 120 is capable of initiating the oven pre-heat 17 minutes before Rob's expected arrival at home and the fryer pre-heat 6 minutes before Rob's expected arrival at home, via communication module 128. Rob bakes his vegetables first because of the longer bake time, and fries the chicken second using the pre-heated devices, initiated at variable pre-heating times. By using home appliance assistant 120 to pre-heat his cooking devices, Rob's food comes out at the same time producing the highest efficiency meal. Additionally, Rob has exercised effective time management.

In the example embodiment, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth network, a WiFi network, or a combination thereof. In general, network 102 can be any combination of connections and protocols that will support communications between computing device 110, home appliance 130, and database server 140.

Figure 5:
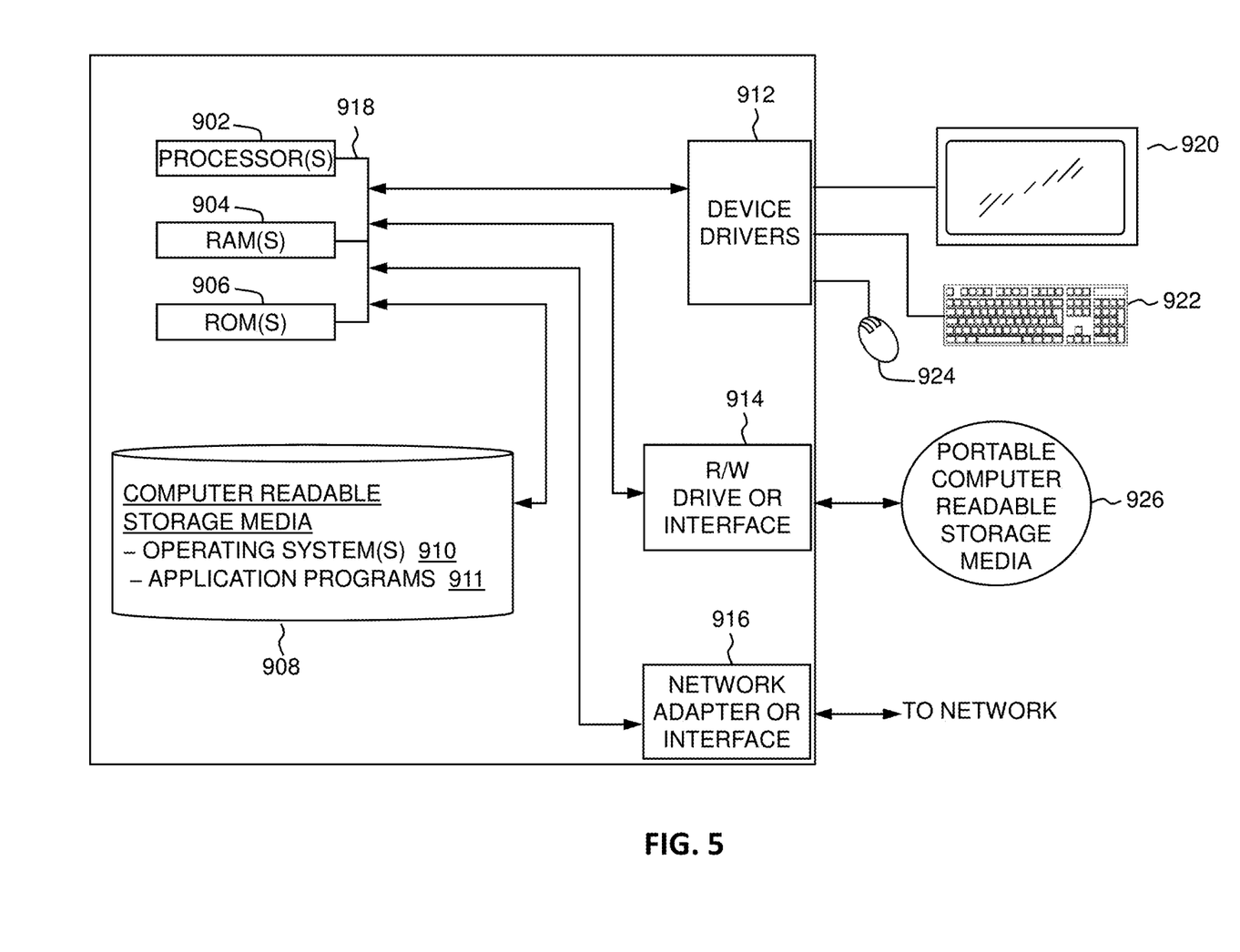
FIG. 5 is a diagram graphically illustrating the hardware components of home appliance computing environment 100 of FIG. 1, in accordance with an embodiment of the present invention.

FIG. 5 is a block diagram depicting components of a computing device (such as computing device 110, as shown in FIG. 1), in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as recipe optimizer assistant 120, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 914 to read from and write to one or more portable computer readable storage media 926. Application programs 911 on computing device 110 may be stored on one or more of the portable computer readable storage media 926, read via the respective R/W drive or interface 914 and loaded into the respective computer readable storage media 908.

Computing device 110 may also include a network adapter or interface 916, such as a TCP/IP adapter card or wireless communication adapter (such as a 4G wireless communication adapter using OFDMA technology). Application programs 911 on computing device 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 6:
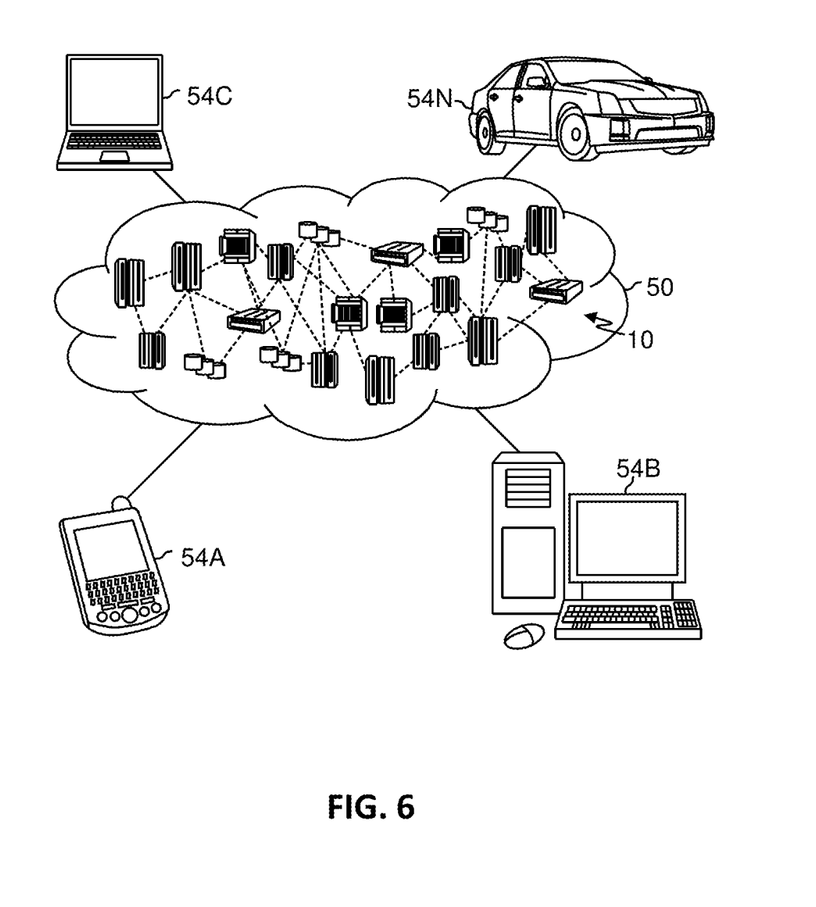
FIG. 6 depicts a cloud computing environment, in accordance with an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
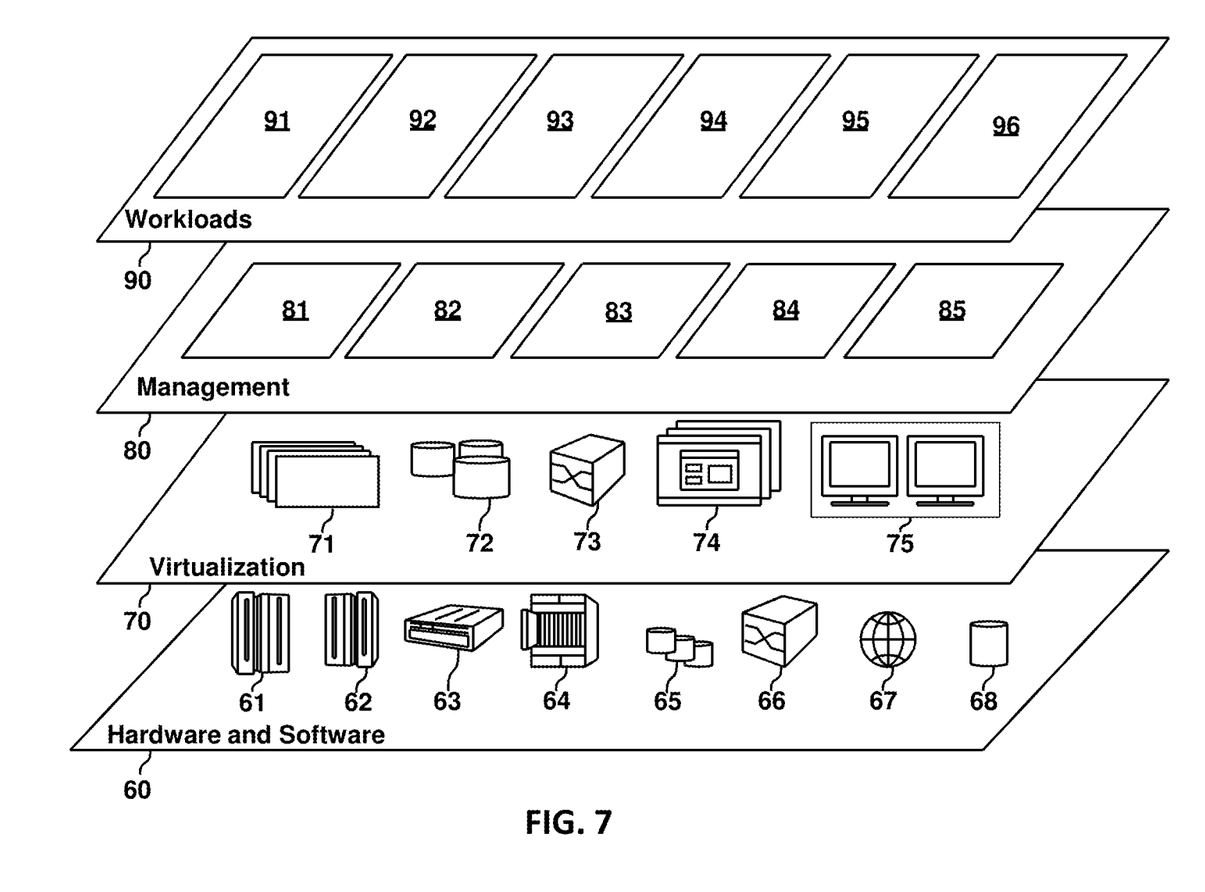
FIG. 7 depicts abstraction model layers of the illustrative cloud computing environment of FIG. 6, in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling access to data objects 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

The invention claimed is:

1. A computer-implemented method for operating one or more appliances, comprising:
   estimating a time period for a user to arrive at a location, wherein the estimated time period is based on one or more time constraints;
   identifying one or more appliances needed based on at least an instruction set;
   determining if the one or more appliances are being utilized, not being utilized, or non-functioning;
   receiving property specifications for the one or more appliances that are not being utilized,
      wherein identifying one or more appliances needed is further based on the determined one or more appliances not being utilized and the received property specifications for the one or more appliances that are not being utilized;
   generating and sending one or more operating commands to the identified one or more appliances based on the estimated time period;
   updating the estimated time period based on a change in the one or more time constraints; and
   generating and sending one or more updated operating commands to the identified one or more appliances, based on the updated estimated time period.

2. The computer-implemented method of claim 1, wherein the instruction set comprises a recipe.

3. The computer-implemented method of claim 1, wherein the one or more time constraints comprise at least one, or a combination, of the following: travel time to arrive at the location, traffic patterns, weather conditions, transportation delays, public events, interrupted transportation services, emergency events, public transportation schedules, and an amount of time required to fulfill an instruction set.

4. The computer-implemented method of claim 1, further comprising:
   detecting a current location of the user; and
   receiving travel data that corresponds to the one or more time constraints,
      wherein the estimated time period for the user to arrive at the location is based on evaluating the received travel data.

5. The computer-implemented method of claim 4, wherein the one or more time constraints comprise at least one, or a combination, of the following: travel time to arrive at the location, traffic patterns, weather conditions, transportation delays, public events, interrupted transportation services, emergency events, public transportation schedules, and an amount of time required to fulfill an instruction set.

6. The computer-implemented method of claim 1, wherein generating and sending one or more operating commands to the identified one or more appliances based on the estimated time period comprises:
   comparing the estimated time period for the user to arrive at the location with an amount of time required to prepare the one or more appliances according to the instruction set; and
   adjusting the one or more appliances, in accordance with the instruction set, before the user arrives at the location based on the estimated time period for the user to arrive at the location.

7. The computer-implemented method of claim 6, wherein adjusting the one or more appliances further comprises at least one, or a combination, of the following: turning on, turning off, raising, lowering, increasing, and decreasing.

8. The computer-implemented method of claim 6, wherein adjusting the one or more appliances further comprises:
   turning the one or more appliances on;
   turning the one or more appliances off; and
   turning the one or more appliances on again based on an updated estimated time period for the user to arrive at the location.

9. The computer-implemented method of claim 6, wherein adjusting the one or more appliances further comprises:
   initiating a pre-heating cycle for an oven so that the oven is ready to bake when the user arrives at the location.

10. The computer-implemented method of claim 9, further comprising:
    extending the pre-heating cycle for the oven by reducing a change in input energy, based on an updated estimated time period for the user to arrive at the location.

11. The computer-implemented method of claim 9, further comprising:
    leaving the pre-heating cycle for the oven intact until a delay threshold is met;
    turning off the pre-heating cycle for the oven, if the delay threshold is greater than a pre-defined value; and
    extending the pre-heating cycle for the oven, if the delay threshold is equal to or less than a pre-defined value.

12. A computer program product for implementing a program that manages a device, comprising a non-transitory tangible storage device having program code embodied therewith, the program code executable by a processor of a computer to perform a method, the method comprising:
    estimating a time period for a user to arrive at a location, wherein the estimated time period is based on one or more time constraints;
    identifying one or more appliances needed based on at least an instruction set;
    determining if the one or more appliances are being utilized, not being utilized, or non-functioning;
    receiving property specifications for the one or more appliances that are not being utilized,
        wherein identifying one or more appliances needed is further based on the determined one or more appliances not being utilized and the received property specifications for the one or more appliances that are not being utilized;
    generating and sending one or more operating commands to the identified one or more appliances based on the estimated time period;
    updating the estimated time period based on a change in the one or more time constraints; and
    generating and sending one or more updated operating commands to the identified one or more appliances, based on the updated estimated time period.

13. The computer program product of claim 12, wherein the one or more time constraints comprise at least one, or a combination, of the following: travel time to arrive at the location, traffic patterns, weather conditions, transportation delays, public events, interrupted transportation services, emergency events, public transportation schedules, and an amount of time required to fulfill an instruction set.

14. The computer program product of claim 12, wherein generating and sending one or more operating commands to the identified one or more appliances based on the estimated time period comprises:
    comparing the estimated time period for the user to arrive at the location with an amount of time required to prepare the one or more appliances according to the instruction set; and
    adjusting the one or more appliances, in accordance with the instruction set, before the user arrives at the location based on the estimated time period for the user to arrive at the location.

15. A computer system for implementing a program that manages a device, comprising:
    one or more computer devices each having one or more processors and one or more non-transitory machine-readable storage devices; and
    a program embodied on at least one of the one or more non-transitory machine-readable storage devices, the program having a plurality of program instructions for execution by the one or more processors, the program instructions comprising instructions for:
        estimating a time period for a user to arrive at a location, wherein the estimated time period is based on one or more time constraints;
        identifying one or more appliances needed based on at least an instruction set;
        determining if the one or more appliances are being utilized, not being utilized, or non-functioning;
        receiving property specifications for the one or more appliances that are not being utilized,
            wherein identifying one or more appliances needed is further based on the determined one or more appliances not being utilized and the received property specifications for the one or more appliances that are not being utilized;
        generating and sending one or more operating commands to the identified one or more appliances based on the estimated time period;
        updating the estimated time period based on a change in the one or more time constraints; and
        generating and sending one or more updated operating commands to the identified one or more appliances, based on the updated estimated time period.

16. The computer system of claim 15, wherein the one or more time constraints comprise at least one, or a combination, of the following: travel time to arrive at the location, traffic patterns, weather conditions, transportation delays, public events, interrupted transportation services, emergency events, public transportation schedules, and an amount of time required to fulfill an instruction set.

17. The computer system of claim 15, wherein generating and sending one or more operating commands to the identified one or more appliances based on the estimated time period comprises:
    comparing the estimated time period for the user to arrive at the location with an amount of time required to prepare the one or more appliances according to the instruction set; and
    adjusting the one or more appliances, in accordance with the instruction set, before the user arrives at the location based on the estimated time period for the user to arrive at the location.

\* \* \* \* \*